Patented Aug. 8, 1944

2,355,586

UNITED STATES PATENT OFFICE 2,355,586

PREPARATION OF ALICYCLIC-ALKYL HALIDES

Ralph P. Perkins, Midland, Mich., assignor to The Dow Chemical Company, Midland, Mich., a corporation of Michigan No Drawing. Application November 15, 1940, Serial No. 365,768

8 Claims. (Cl. 260—648)

This invention concerns an improved method of preparing alicyclic-alkyl halides having the general formula:

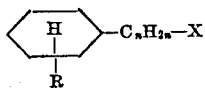

wherein the symbol H within the ring is employed as usual to indicate that it is an alicyclic, not an aromatic, ring; R represents hydrogen or a lower alkyl radical; X represents a halogen which is attached in a primary position to a carbon atom of the aliphatic radical, $C_nH_{2n}$; and $n$ is an integer greater than one and less than 5. The invention also concerns certain new ethers having the general formula:

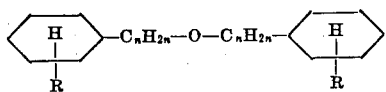

which are obtainable by the method. It particularly concerns an improved method of making beta-cyclohexyl-ethyl bromide and also the new compound, bis-(beta-cyclohexyl-ethyl) ether, obtained in the process.

It is known that beta-cyclohexyl-ethyl bromide may be prepared in fair yield by heating beta-cyclohexyl-ethyl alcohol with an aqueous mixture of sulphuric and hydrobromic acids. However, the organic reactant, beta-cyclohexyl-ethyl alcohol, is not readily available and the methods known for its preparation do not produce it in high yield. For instance, Hiers et al. J. A. C. S. 48 1091 (1926) prepared beta-cyclohexyl-ethyl bromide from cyclohexyl bromide, ethylene oxide and hydrobromic acid by first reacting the cyclohexyl bromide with magnesium to form cyclohexylmagnesium bromide; reacting the latter with ethylene oxide and hydrolyzing the product to obtain beta-cyclohexyl-ethyl alcohol; and reacting said alcohol with hydrobromic acid in the presence of sulphuric acid as a condensing agent to obtain the beta-cyclohexyl-ethyl bromide product. The yield of the intermediate product, cyclohexyl-ethyl alcohol, was only 53 per cent of theoretical in a small laboratory experiment and was indicated to be lower, i. e. only 44 per cent, when prepared on larger scale. The yield of beta-cyclohexyl-ethyl bromide from the reaction of hydrobromic acid with said alcohol was 65 per cent of theoretical. Accordingly, the over-all yield of beta-cyclohexyl-ethyl bromide from the starting materials, cyclohexyl bromide, ethylene oxide and hydrobromic acid, was at best only 35 per cent of theoretical and was lower when the reactions for the preparation of the intermediate alcohol product were carried out on fair-sized scale.

It is an object of this invention to provide a new method of making alicyclic-alkyl halides having the general formula hereinbefore given, whereby such products may be obtained in higher yields than is possible by the method for their preparation heretofore known. Another object is to provide certain new alicyclic-alkyl ethers, obtained in the process, which ethers are useful as plasticizing agents for natural and synthetic resins and also as organic solvents, particularly as solvents or bases for perfumes. A particular object is to provide a method whereby beta-cyclohexyl-ethyl bromide may be prepared in good yield from starting materials which are readily available. Other objects will be apparent from the following description of the invention.

Alicyclic-n-alkyl halides are prepared according to the invention by: (1) dehydrating an aryl-n-alkyl alcohol to form the corresponding bis-(aryl-n-alkyl-) ether; (2) hydrogenating the latter to obtain a bis-(alicyclic-n-alkyl-) ether; and (3) reacting said ether with a hydrogen halide to obtain the alicyclic-n-alkyl halide product. Each reaction may be carried out smoothly and nearly to completion without excessive by-product formation. For instance, in preparing beta-cyclohexyl ethyl bromide from beta-phenyl-ethyl alcohol by this series of steps or reactions, yields of 80 per cent of theoretical and higher are readily obtainable in each of the first two steps and yields of 90 per cent and higher are obtainable in the last step. The over-all yield of beta-cyclohexyl-ethyl bromide from the starting material, beta-phenyl-ethyl alcohol, is usually greater than 57 per cent of theoretical.

In preparing beta-cyclohexyl-ethyl bromide by the present method, beta-phenyl-ethyl alcohol is treated with an efficient condensing agent, or dehydration catalyst, and the mixture is heated, e. g. at temperatures between 150° C. and 200° C., and preferably between 170° C. and 175° C., until the reaction is substantially complete. Among the various condensing agents which may be employed in the reaction are concentrated sulphuric acid; organic sulphonic acids, such as benzene sulphonic acid or naphthalene sulphonic acid, etc.; and alkali metal acid sulphates such as sodium or potassium acid sulphate. The condensing agent is usually employed in amount corresponding to between 2 and 10 per cent of the weight of the phenyl-ethyl alcohol, but it may be used in larger or in somewhat smaller proportion if desired. Water is preferably distilled from the reaction mixture as it is formed. The removal of water may be facilitated, and the reaction thus furthered, by carrying the reaction out in the presence of an inert water-immiscible liquid, such as benzene, toluene, or ethylene chloride, etc., which will distill together with the water as a relatively low-boiling azeotrope. The water-immiscible liquid may, of course, be introduced prior to, or during, the reaction and may be separated from the water in the distillate and be returned continuously or intermittently to the reaction mixture. The time of heating necessary to complete the reaction is dependent upon the reaction temperature, the kind and proportion of condensing agent used, and upon whether or not an immiscible liquid is introduced to facilitate removal of the water formed. However, when operating in accordance with the preferred conditions just given, the reaction is usually complete after 6 to 12 hours of heating. The reacted mixture is preferably neutralized or rendered slightly alkaline, e. g. by treatment with sodium hydroxide, sodium carbonate or other basic compound, and fractionally distilled to separate the bis-(beta-phenyl-ethyl-) ether product.

The ether so obtained is treated with an active hydrogenation catalyst, e. g. platinum, reduced nickel or cobalt, or "Raney nickel," or a promoted metal catalyst rich in nickel such as a reduced mixture of 80 per cent Ni, 10 per cent Fe, and 10 per cent Cu, and hydrogenated in accordance with usual procedure. The hydrogenation catalyst is usually employed in amount corresponding to between 2 and 8 per cent of the weight of the ether, but may be used in other proportions if desired. The hydrogenation is usually carried out with a reduced nickel catalyst in a bomb or other closed reactor with agitation at temperatures between 100° C. and 160° C. under a hydrogen pressure of between 200 and 500 pounds per square inch, gauge, but other temperatures and pressures may be used. After completing the hydrogenation, the pressure is released and the mixture is filtered to recover the catalyst therefrom and distilled to separate the bis-(beta-cyclohexyl-ethyl-) ether product.

The bis-(beta-cyclohexyl-ethyl-) ether is reacted with hydrogen bromide to form the desired beta-cyclohexyl-ethyl bromide end-product. Either substantially anhydrous hydrogen bromide or an aqueous mixture of hydrobromic acid and another acid capable of combining with the water formed, e. g. sulphuric acid, may be used in the reaction. The hydrogen bromide or hydrobromic acid is advantageously used in amount corresponding to the molecular equivalent or more of the ether. When anhydrous hydrogen bromide is to be used in the reaction, the ether is preferably saturated, e. g. at room temperature or lower, with gaseous hydrogen bromide and is thereafter gradually heated to its boiling point, or thereabout. When an aqueous hydrobromic acid solution is to be employed in the reaction, the ether is preferably dissolved in concentrated sulphuric acid, the mixture is cooled, e. g. to 20° C. or lower, and the aqueous hydrobromic acid solution is added gradually while maintaining the mixture in cooled condition. The hydrobromic acid solution is employed in amount corresponding to 2 moles or more, preferably between 2 and 4 moles, of hydrogen bromide per mole of the ether. One mole or more of sulphuric acid is used per mole of water in the reaction mixture. The mixture is permitted to stand at room temperature or thereabout for from 1 to 6 hours, after which it is gradually heated to boiling. Regardless of whether hydrogen bromide or aqueous hydrobromic acid is used, the reaction mixture is heated to its boiling point or thereabout for from 4 to 10 hours. However, the reaction may be carried out at other temperatures, e. g. at temperatures between 60° C. and 180° C. When operating at temperatures above the normal boiling temperature of the mixture, it is necessary, of course, that the reaction be carried out under pressure, e. g. in a bomb or autoclave.

After completing the reaction, the mixture is cooled and the organic and aqueous layers thereof are separated. The organic layer may be washed with concentrated sulphuric acid, then with water, or preferably with an aqueous alkali solution, to remove dissolved acid, and distilled to separate the beta-cyclohexyl-ethyl bromide product.

Other alicyclic-n-alkyl halides may advantageously be prepared from corresponding aromatic-n-alkyl alcohols by similar procedures. For instance, if hydrogen iodide, instead of hydrogen bromide is employed in the particular application of the process described above, the final product is beta-cyclohexyl-ethyl iodide. Similarly, hydrogen chloride may be used instead of hydrogen bromide or hydrogen iodide in the above-described application of the process to obtain beta-cyclohexyl-ethyl chloride as the product. However, hydrogen chloride is less active than hydrogen bromide, and the latter is usually somewhat less active than hydrogen iodide in reacting with bis-(alicyclic-alkyl) ethers to form the alicyclic-alkyl halide products. In using hydrogen chloride in such reaction, the latter is advantageously carried out under pressure at temperatures as high or higher than those employed when using hydrogen bromide as a reactant.

The invention may also advantageously be applied in preparing beta-(2-methyl-cyclohexyl-) ethyl chloride or bromide or iodide from beta-(ortho-methyl-phenyl-) ethyl alcohol; beta-(3-methyl-cyclohexyl-) ethyl chloride, bromide or iodide from beta-(meta-methyl-phenyl-) ethyl alcohol; beta-(4-methyl-cyclohexyl-) ethyl chloride, bromide or iodide from beta-(para-methyl-phenyl-) ethyl alcohol; beta-(4-ethyl-cyclohexyl-) ethyl chloride, bromide or iodide from beta-(para-ethyl-phenyl-) ethyl alcohol; gamma-cyclohexyl-propyl chloride, bromide or iodide from gamma-phenyl-propyl alcohol; delta-cyclohexyl-butyl chloride, bromide or iodide from delta-phenyl-butyl alcohol; and gamma-(4-isopropyl-cyclohexyl-) propyl chloride, bromide or iodide from gamma-(para-isopropyl-phenyl-) propyl alcohol; etc.

The following examples describe certain ways in which the principle of the invention has been applied, but are not to be construed as limiting the invention.

*Example 1*

A mixture of 976 grams of beta-phenyl-ethyl alcohol and 48.8 grams of sodium acid sulphate monohydrate (NaHSO4H2O) was heated under reflux with stirring at temperatures between 168° C. and 178° C. for 14 hours, while gradually distilling off water formed by the reaction. A total of 63 grams of water was distilled from the mixture during the heating. A small amount of oily material distilled together with the water, but this was separated from the aqueous layer of the distillate and returned continuously to the reaction mixture. The mixture was thereafter cooled, washed successively with water, an aqueous sodium carbonate solution, and water and fractionally distilled under vacuum. There were obtained 95.5 grams of unreacted phenyl-ethyl alcohol and 726.1 grams of bis-(beta-phenyl-ethyl) ether which distilled at 190° C.–195° C. at 20 millimeters absolute pressure. The ether product was slightly yellow and contained a small amount of dissolved sulphur dioxide. It was washed with a solution of 35 grams of sodium carbonate in 250 cubic centimeters of water, then with 1 liter of water alone, and redistilled. There was obtained 710.6 grams of nearly colorless purified bis-(beta-phenyl-ethyl) ether. The yield was 87.1 per cent of theoretical, based on the phenyl-ethyl alcohol consumed. This ether was hydrogenated soon after its preparation, since I had, in other experiments, observed that if permitted to stand it tends to absorb air and quite rapidly becomes contaminated with organic peroxides which are poisonous toward hydrogenation catalysts. The hydrogenation was carried out by charging a bomb with 250 grams of the bis-(beta-phenyl-ethyl) ether and 12.5 grams of a hydrogenation catalyst consisting essentially of 50 per cent by weight of reduced nickel on diatomaceous earth as a support therefor. The bomb was then charged with hydrogen at a pressure of about 500 pounds per square inch and was heated with agitation at a temperature of about 140° C. for 26 hours. The pressure was then released and the charge was removed and filtered to recover the catalyst. The mixture was then fractionally distilled under vacuum, whereby 220.2 grams of bis-(beta-cyclohexyl-ethyl) ether distilling at 180° C.–184° C. at 20 millimeters pressure was obtained. The yield was 83.6 per cent of theoretical. The bis-(beta-cyclohexyl-ethyl) ether is a colorless liquid compound which boils at 164° C.–165° C. at 10 millimeters pressure, or at approximately 220° C. at 100 millimeters pressure. It has the specific gravity, $D_{25}^{25}=0.909$ and the index of refraction $n_D^{25}=1.472$. Gaseous hydrogen bromide was passed into 203.4 grams of the bis-(beta-cyclohexyl-ethyl) ether until 141.3 grams of hydrogen bromide was absorbed. The solution was gradually heated to about 130° C., where boiling occurred, and was maintained at temperatures between 130° C. and 132° C. for 4 hours. It was then cooled to room temperature and again saturated with gaseous hydrogen bromide, only 27.2 grams of the latter being absorbed in this treatment. The resultant mixture was boiled under reflux for 3.5 hours. It was then cooled, washed thoroughly with water and fractionally distilled. There was obtained 295.3 grams of beta-cyclohexyl-ethyl bromide, distilling at temperatures between 101° C. and 103° C. at 25 millimeters pressure. The yield was 90.4 per cent of theoretical based on the bis-(beta-cyclohexyl-ethyl) ether employed. The over-all yield of beta-cyclohexyl-ethyl bromide, based on materials consumed in the series of reactions, was higher than 65 per cent of theoretical.

*Example 2*

A mixture of 340.2 grams of gamma-phenyl-propyl alcohol and 17 grams of sodium acid sulphate monohydrate was heated under reflux with stirring at temperatures ranging from 170° C. to 188° C. for about 7 hours, while permitting water formed by the reaction to distill from the mixture. The latter was then cooled and successively washed with water and with a hot aqueous sodium hydroxide solution and distilled. There were obtained 28 grams of unreacted gamma-phenyl-propyl alcohol and 220.5 grams of bis-(gamma-phenyl-propyl) ether which distilled at temperatures between 218° C. and 220° C. at 20 millimeters absolute pressure. The yield of ether was approximately 66.5 per cent of theoretical, based on the gamma-phenyl-propyl alcohol. 180 grams of the bis-(gamma-phenyl-propyl) ether was hydrogenated as in Example 1. There was obtained 151.6 grams, or 80.3 per cent of the theoretical yield, of bis-(gamma-cyclohexyl-propyl) ether. The latter is a colorless liquid compound which boils at approximately 208° C.–210° C. at 20 millimeters absolute pressure. It has the specific gravity $D_{25}^{25}=0.897$ and the index of refraction $n_D^{25}=1.470$. A portion of the bis-(gamma-cyclohexyl-propyl) ether was heated with concentrated sulphuric acid and an aqueous solution of hydrobromic acid, whereby gamma-cyclohexyl-propyl-bromide was formed. The gamma-cyclohexyl-propyl-bromide product is a colorless liquid boiling at 118° C.–120° C. at 20 millimeters pressure, having the index of refraction $n_D^{25}=1.486$ and the specific gravity, $D_{25}^{25}=1.196$.

*Example 3*

Bis-(beta-(para-methyl-phenyl-) ethyl) ether was prepared in 81.9 per cent of the theoretical yield by heating 340 grams of beta-(para-methyl-phenyl-) ethyl alcohol and 17 grams of sodium acid sulphate hydrate under reflux for 5 hours while distilling water from the mixture as it was formed. Said ether is a crystalline solid which melts at 50° C.–51° C. and distills at temperatures between 220° C. and 224° C. at 25 millimeters pressure. The bis-(beta-(para-methyl-phenyl-) ethyl) ether was hydrogenated by procedure similar to that described in Example 1, whereby bis-(beta-4-methyl-cyclohexyl-ethyl) ether was obtained in 63 per cent yield. This ether is a colorless liquid compound boiling at 205° C.–207° C. at 25 millimeters pressure and having the specific gravity, $D_{25}^{25}=0.892$ and the index of refraction $n_D^{25}=1.467$. The bis-(beta-4-methyl-cyclohexyl-ethyl) ether was reacted with hydrogen bromide as in Example 1, whereby beta-4-methyl-cyclohexyl-ethyl bromide was obtained in approximately 59 per cent yield. Said product is a colorless liquid which boils at 110° C.–111° C. at 20 millimeters pressure and has the specific gravity, $D_{25}^{25}=1.192$, and the index of refraction, $n_D^{25}=1.484$.

Other modes of applying the principle of the invention may be employed instead of those explained, change being made as regards the method or compounds herein disclosed, provided the step or compounds stated by any of the following claims or the equivalent of such stated step or compounds be employed.

I claim:

1. The method of making an alicyclic-alkyl halide which comprises dehydrating an aryl-aliphatic alcohol having the general formula:

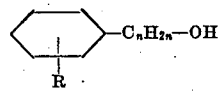

wherein R represents a member of the group consisting of hydrogen and lower alkyl radicals, $n$ is an integer greater than one and less than 5, and the hydroxyl group is attached to a primary carbon atom, to form a corresponding ether, hydrogenating the latter to form a bis-(alicyclic-alkyl) ether and reacting said ether with a hydrohalic acid to form an alicyclic-alkyl halide.

2. The method of making an alicyclic-alkyl halide which comprises dehydrating an aryl-aliphatic alcohol having the general formula:

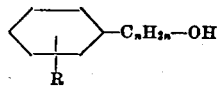

wherein R is a member of the group consisting of hydrogen and lower alkyl radicals, $C_nH_{2n}$ is a normal alkylene radical having the hydroxyl group attached thereto in a primary position, and $n$ is an integer greater than one and less than 5, to form the corresponding ether, hydrogenating the latter to form a bis-(alicyclic-alkyl) ether and reacting this ether with a hydrohalic acid to form an alicyclic-alkyl halide.

3. The method which comprises dehydrating an alcohol having the general formula:

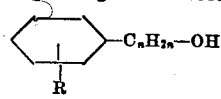

wherein R is a member of the group consisting of hydrogen and lower alkyl radicals, $C_nH_{2n}$ is a normal alkylene radical having hydroxyl group attached thereto in a primary position and $n$ is an integer greater than one and less than 5, to form the corresponding ether, hydrogenating said ether to obtain a bis-(alicyclic-alkyl) ether and reacting the latter with hydrobromic acid to form an alicyclic-alkyl bromide.

4. The method which comprises dehydrating an alcohol having the general formula:

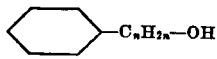

wherein the hydroxyl group is attached to a primary carbon atom and $n$ is an integer greater than one and less than 5, to form the corresponding ether, hydrogenating said ether to obtain a bis-(cyclo-hexyl-alkyl) ether and reacting the latter with a hydrohalic acid to form a cyclohexyl-alkyl halide.

5. The method which comprises dehydrating an alcohol having the general formula:

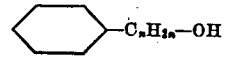

wherein $C_nH_{2n}$ is a normal alkylene radical having the hydroxyl group attached thereto in a primary position, and $n$ is an integer greater than one and less than 5, to form the corresponding ether, hydrogenating said ether to obtain a bis-(cyclohexyl-alkyl) ether and reacting the bis-(cyclohexyl-alkyl) ether with a hydrohalic acid to form a cyclohexyl-alkyl halide.

6. The method which comprises dehydrating an aryl-aliphatic alcohol having the general formula:

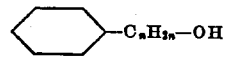

wherein $C_nH_{2n}$ is a normal alkylene radical containing at least two carbon atoms and having the hydroxyl group attached thereto in a primary position, to form a bis-(aryl-alkyl) ether, hydrogenating this ether to obtain a bis-(cyclohexyl-alkyl) ether, and reacting the latter with hydrogen bromide to form a cyclohexyl-alkyl bromide.

7. The method which comprises dehydrating beta-phenyl-ethyl alcohol to form bis-(beta-phenyl-ethyl) ether, hydrogenating the latter to obtain bis-(beta-cyclohexyl-ethyl) ether, and reacting this ether with a hydrohalic acid to form a beta-cyclohexyl-ethyl halide.

8. The method which comprises dehydrating beta-phenyl-ethyl alcohol to form bis-(beta-phenyl-ethyl) ether, hydrogenating the latter to obtain bis-(beta-cyclohexyl-ethyl) ether, and reacting this ether with hydrogen bromide to form beta-cyclohexyl-ethyl bromide.

RALPH P. PERKINS.